US007014295B2

(12) United States Patent
Hickman et al.

(10) Patent No.: US 7,014,295 B2
(45) Date of Patent: *Mar. 21, 2006

(54) SYSTEM AND METHOD FOR PRODUCING EFFICIENT INK DROP OVERLAP FILLED WITH A PSEUDO HEXAGONAL GRID PATTERN

(75) Inventors: Mark S. Hickman, Vancouver, WA (US); Wayne M. Richard, San Diego, CA (US); Jorge Castano, Barcelona (ES); John A. Underwood, Vancouver, WA (US); Xavier Bruch, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 80 days.

This patent is subject to a terminal disclaimer.

(21) Appl. No.: 10/714,300

(22) Filed: Nov. 15, 2003

(65) Prior Publication Data

US 2004/0095421 A1 May 20, 2004

Related U.S. Application Data

(62) Division of application No. 09/909,572, filed on Jul. 20, 2001, now Pat. No. 6,659,589.

(51) Int. Cl.
*B41J 2/15* (2006.01)
*G06K 15/00* (2006.01)

(52) U.S. Cl. .......................... 347/41; 358/1.9; 358/3.16

(58) Field of Classification Search .................. 347/15, 347/41, 43, 16; 358/1.2, 1.8, 1.9, 3.16, 3.17, 358/3.18, 3.13

See application file for complete search history.

(56) References Cited

U.S. PATENT DOCUMENTS 6,659,589 B1 * 12/2003 Hickman et al. ............. 347/41

* cited by examiner

*Primary Examiner*—Lamson Nguyen

(57) ABSTRACT

The present invention is embodied in a system and method for producing efficient ink drop overlap filled with a pseudo hexagonal grid pattern. In general, the present invention can include an inkjet printhead assembly that incorporates a preprogrammed correction scheme or schemes [1–n] (herein correction scheme will refer to all applications), for correcting systematic ink drop placement errors of the inkjet printhead. The printing system of the present invention uses a unique ink dot pattern, called a pseudo-hexagonal close pack system. The present invention optimizes the addressable grid for dot placement, pseudo hexagonal close pack system, with an efficient geometry for packing circles to fill an area, similar to the hexagonal close pack system. However, the present invention in creating dots on a non-symmetric grid is supported by available software and is not computationally complex.

13 Claims, 6 Drawing Sheets

SYSTEM AND METHOD FOR PRODUCING EFFICIENT INK DROP OVERLAP FILLED WITH A PSEUDO HEXAGONAL GRID PATTERN

This application is a division application of application Ser. No. 09/909,5725, filed Jul. 20, 2004 now U.S. Pat. No. 6,659,589.

FIELD OF THE INVENTION

The present invention generally relates to inkjet and other types of printers and more particularly, to a system and method for producing efficient ink drop overlap filled with a pseudo hexagonal grid pattern.

BACKGROUND OF THE INVENTION

Inkjet printers print dots by ejecting very small drops of ink onto the print media and typically include a movable carriage that supports one or more print cartridges each having a printhead with a nozzle member having ink ejecting nozzles. The carriage traverses over the surface of the print media. For any line of print, the carriage may make more than one traverse and utilize a varying number of nozzles in the array.

To complete a full line, the print head passes a specified number of times in a single or multi pass pattern. The print mode may have a number of parameters; the number of passes required to fill the area, and the position of the ink droplets at every pass. To define this feature, a matrix is created that defines each position of each pass in which a drop may print. The matrix is called the printmode mask.

Lines, text and graphics are normally printed with all nozzles aligned in the horizontal, or scan, axis. Defects, including, tails, spray drops and spear drops, can result in rough edges, vertical lines, horizontal lines, banding, and changes in hues on the print media. These defects may be due to a number of factors including nozzle alignment, nozzle outs, the firing frequency or the pen or noise.

The pattern on the print media is altered due to nozzle outs. A printhead with small drop volumes but utilizing a larger number of nozzles would increase the probability of a nozzle out, but each would have a decrease in visibility. For an unbiased writing system missing nozzle defects would scale linearly for any given color.

Printheads may develop mechanical noise. These changes to pen alignment through pen to pen alignment or vibration of the printhead may offset the printing pattern in a regular manner leading to a consistent defect such as banding. To offset this effect, the dots may be printed in a micro-stepping process, a multi-pass process, a process using multiple sized dots and inter-placing these dots, or by utilizing a random or Dithering Pattern.

In general, digital printing systems employ a dot placement pattern whereby circular dots are placed on a rectangular co-ordinate system. This pattern is convenient for the calculation of the placement of data. However the circular dots have to be relatively large to completely cover the media with a lot of dot overlap in areas directly between two adjacent dots, and little overlap at the points of the grid that fall between any four neighboring dots. As such, the rectangular system that uses larger drops requires more ink or toner to completely cover the print media. Therefore, what is needed is a printing system that solves the above problems.

SUMMARY OF THE INVENTION

To overcome the limitations in the prior art described above, and to overcome other limitations that will become apparent upon reading and understanding the present specification, the present invention is embodied in a system and method for producing efficient ink drop overlap filled with a pseudo hexagonal grid pattern.

In general, the present invention can include an inkjet printhead assembly that incorporates a preprogrammed correction scheme or schemes [1–n] (herein correction scheme will refer to all applications), for correcting systematic ink drop placement errors of the inkjet printhead. A general correction scheme can be developed for a class of inkjet printhead assemblies during manufacturing of the class of inkjet printhead assemblies. The correction scheme could include general corrections that cover general errors that exist for the entire class of inkjet printheads. Alternatively, individual correction schemes can be developed during manufacturing of each individual inkjet printhead assembly that covers specific errors that exists for each individual printhead.

The correction scheme can be controlled by a printer driver as software operating on a computer system that is connected to the inkjet printer or as firmware incorporated into the printer in a controller device. Also, the correction scheme can be encoded on a memory device incorporated into inkjet printhead assembly itself. In this case, the memory device could also store other various printhead specific data. The data can include identification, warranty, characterization usage, systematic ink drop placement errors, etc. Information can be written and stored at the time the printhead assembly is manufactured or during printer operation. The correction scheme can be accessed and applied by the printer driver.

In another embodiment, the inkjet printhead assembly includes an image mapping processor that has the ability to apply the correction scheme during printing operations. The image mapping processor can receive the correction scheme from the memory device or from the printer driver. The image mapping processor can make other decisions, such as making its own firing and timing decisions for providing efficient thermal and energy control. For example, it can be preprogrammed to regulate edge errors, depending on the quality of print desired by a user. In addition, the image mapping processor can aid in calibrating the printhead assembly in real time. Further, in another embodiment of the invention, it operates in conjunction with available rasterization engines using commercially viable software products.

BRIEF DESCRIPTION OF THE DRAWINGS

The present invention can be further understood by reference to the following description and attached drawings that illustrate the preferred embodiment. Other features and advantages will be apparent from the following detailed description of the preferred embodiment, taken in conjunction with the accompanying drawings, which illustrate, by way of example, the principles of the invention.

DETAILED DESCRIPTION OF THE PREFERRED EMBODIMENTS

In the following description of the invention, reference is made to the accompanying drawings, which form a part hereof, and in which is shown by way of illustration a specific example in which the invention may be practiced. It is to be understood that other embodiments may be utilized and changes may be made without departing from the scope of the present invention.

1. General Overview

Figure 1:
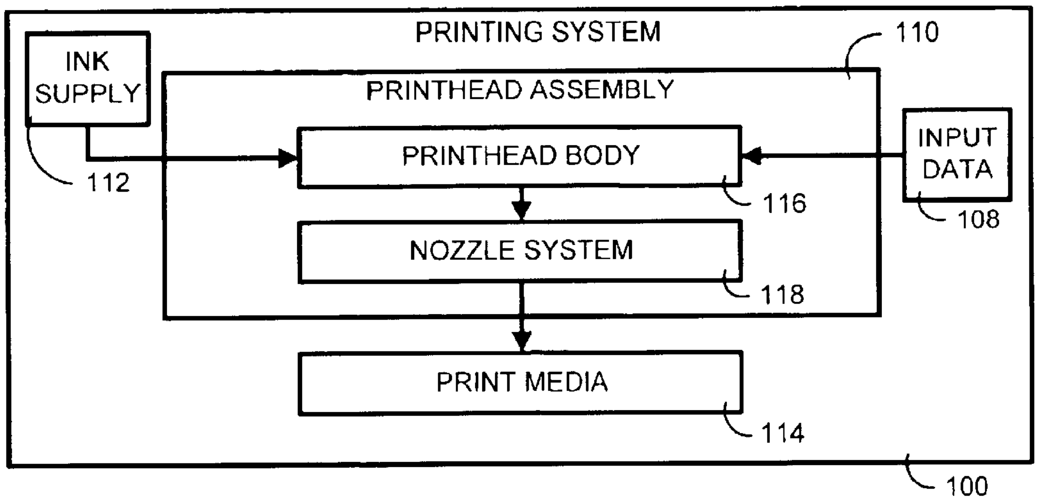
FIG. 1 shows a block diagram of an overall printing system incorporating the present invention.

FIG. 1 shows a block diagram of an overall printing system incorporating the present invention. The printing system 100 of the present invention reduces sensitivity to dot placement errors in digital printing systems using pseudo-hexagonal drop placement. The printing system 100 includes a printhead assembly 110, an ink supply 112 and print media 114. The printhead assembly 110 includes a printhead body 116 and a nozzle system 118. The printhead body 116 is securely coupled to the nozzle system 118 with an adhesive arrangement. Data to the printhead assembly is supplied through the input data 108 system.

During a printing operation, ink is provided from the ink supply 112 to an interior portion (such as an ink reservoir) of the printhead body 116. The interior portion of the printhead body 116 provides ink through ink channels to the nozzle system 118. Namely, the printhead assembly 110 receives commands from a processor (not shown) to print ink and form a desired pattern for generating text and images on the print media 114. Print quality of the desired pattern is dependent on accurate placement of the ink droplets on the print media 114.

In general, the present invention is a printing system that places drops of ink/toner on a geometrically efficient dot grid. The most geometrically efficient system into which circles can be packed to fill an area is the hexagonal close pack system. However, the hexagonal close pack system is computationally complex and would require the development of appropriate software. The present invention also optimizes the addressable grid for dot placement, with an efficient geometry into which circles can be packed to fill an area. In addition, the present invention can create dots on a non-symmetric grid that is not computationally complex and can be supported by available software.

Consequently, defects on the print media are minimized, while conserving the use of ink or toner. The system also operates on available rasterization engines so that it would be commercially viable in that it would utilize available software. The system also allows for greater dot misplacement, or allows a balance in dot size for a combination of decreased ink/toner with a decrease in sensitivity to placement error. This system results in a decrease in the white space between lines of print and a decrease in the hue shift banding due to small changes in pen to pen alignment. Further, the ink droplets are ordered in a pattern that will eliminate the random clustering of drops. This will result in a decrease in banding and more consistent color hues in the printed image.

II. Exemplary Printing System

Figure 2:
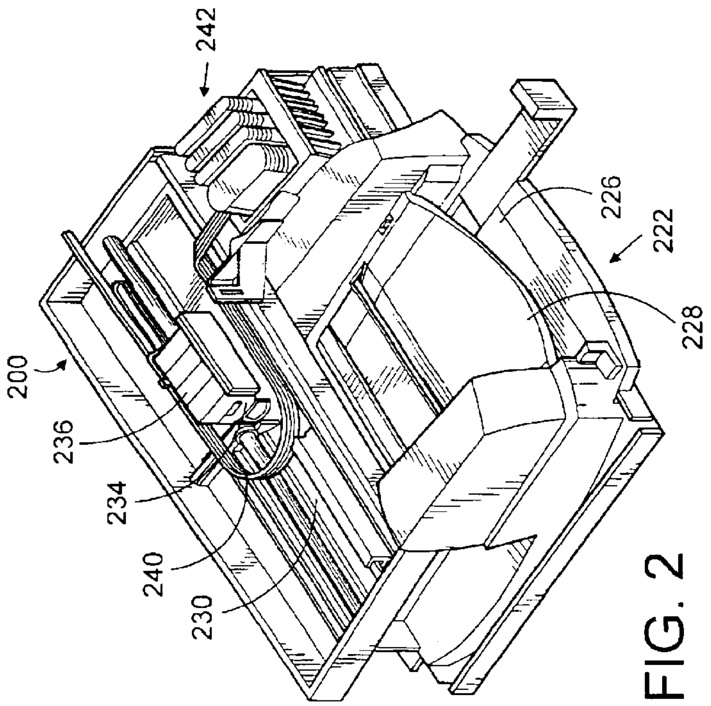
FIG. 2 is an exemplary printer that incorporates the present invention and is shown for purposes of illustration.

FIG. 2 is an exemplary high-speed printer that incorporates the invention and is shown for illustrative purposes only. Generally, printer 200 includes printing system 100 for reducing sensitivity to dot placement errors in digital printing systems using pseudo-hexagonal drop placement. The printer 200 includes a tray 222 for holding print media 114 (shown in FIG. 1). When a printing operation is initiated, print media 114, such as a sheet of paper, is fed into printer 200 from tray 222 preferably using a sheet feeder 226. The sheet then brought around in a U direction and travels in an opposite direction toward output tray 228. Other paper paths, such as a straight paper path, can also be used.

The sheet is stopped in a print zone 230, and a scanning carriage 234, supporting one or more print cartridges 236, is then scanned across the sheet for printing a swath of ink thereon. After a single scan or multiple scans, the sheet is then incrementally shifted using, for example, a stepper motor or paper advance motor 238 and feed rollers to a next position within the print zone 230. Carriage 234 again scans across the sheet for printing a next swath of ink. The process repeats until the entire sheet has been printed, at which point it is ejected into output tray 228.

The present invention is equally applicable to alternative printing systems (not shown) such as those incorporating grit wheel or drum technology to support and move the print media 114 relative to the printhead assembly 110. With a grit wheel design, a grit wheel and pinch roller move the media back and forth along one axis while a carriage carrying one or more printheads scans past the media along an orthogonal axis. With a drum printer design, the media is mounted to a rotating drum that is rotated along one axis while a carriage carrying one or more printheads scans past the media along an orthogonal axis. In either the drum or grit wheel designs, the scanning is typically not done in a back and forth manner as is the case for the system depicted in FIG. 2.

The print cartridges 236 may be removeably mounted or permanently mounted to the scanning carriage 234. Also, the print cartridges 236 can have self-contained ink reservoirs in the body of the printhead as the ink supply 112 (shown in FIG. 1). The self-contained ink reservoirs can be refilled with ink for reusing the print cartridges 236. Alternatively, the print cartridges 236 can be each fluidically coupled, via a flexible conduit 240, to one of a plurality of fixed or removable ink containers 242 acting as the ink supply 112 (shown in FIG. 1). As a further alternative, ink supplies 112 can be one or more ink containers separate or separable from print cartridges 236 and removeably mountable to carriage 234. The cartridges 236 in this system may be single color, multi color or multi colorant concentration and are not limited to single colors.

Figure 3:
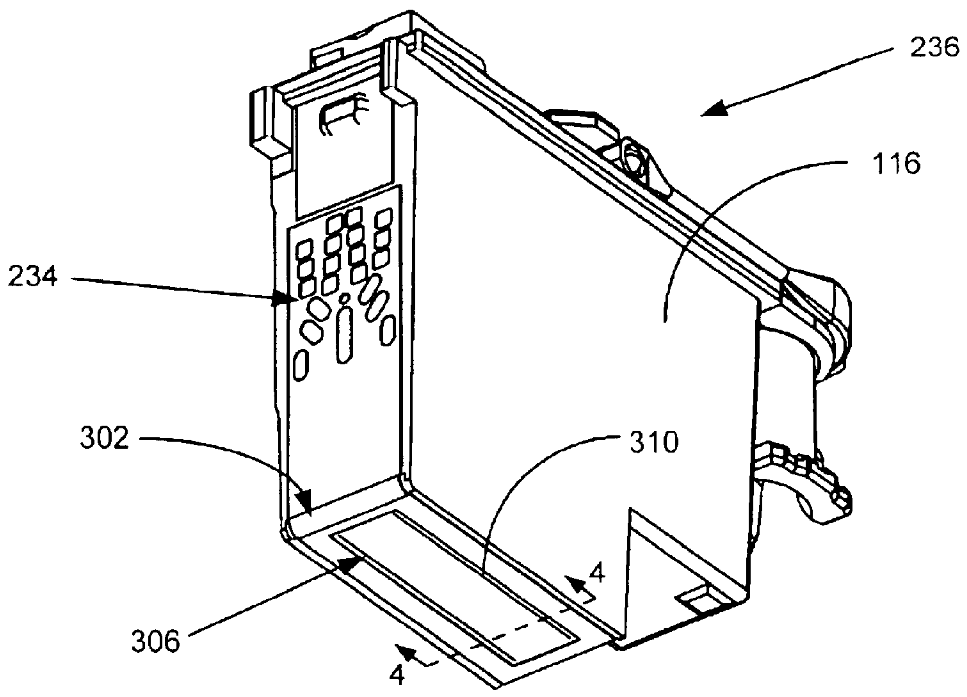
FIG. 3 shows for illustrative purposes only a perspective view of an exemplary print cartridge incorporating the present invention.

FIG. 3 shows for illustrative purposes only a perspective view of an exemplary printhead assembly 300 (an example of the printhead assembly 110 of FIG. 1) incorporating the printing system 100 of the present invention for reducing sensitivity to dot placement errors in digital printing systems using pseudo-hexagonal drop placement. A detailed description of the pseudo-hexagonal drop placement system and method of the present invention follows with reference to a typical printhead assembly used with a typical printer, such as printer 200 of FIG. 2 that includes the pseudo-hexagonal drop placement system and method. However, the present invention can be incorporated in any printhead and printer configuration.

Referring to FIGS. 1 and 2 along with FIG. 3, the printhead assembly 110 is comprised of a thermal head assembly 302 and a printhead body 116. The thermal head assembly 302 can be a flexible material commonly referred to as a Tape Automated Bonding (TAB) assembly. The thermal head assembly 302 contains a flexible nozzle member 306 and interconnect contact pads (not shown) and is secured to the printhead assembly 110. The thermal head assembly 302 can be secured to the print cartridge 236 with suitable adhesives. An integrated circuit chip (not shown) provides feedback to the printer 200 regarding certain parameters of printhead assembly 110. The contact pads align with, and electrically contact, electrodes (not shown) on carriage 234. The nozzle member 306 preferably contains plural parallel rows of offset nozzles 310 through the thermal head assembly 302 created by, for example, laser ablation. It should be noted that other nozzle arrangements can be used, such as non-offset parallel rows of nozzles.

Figure 4:
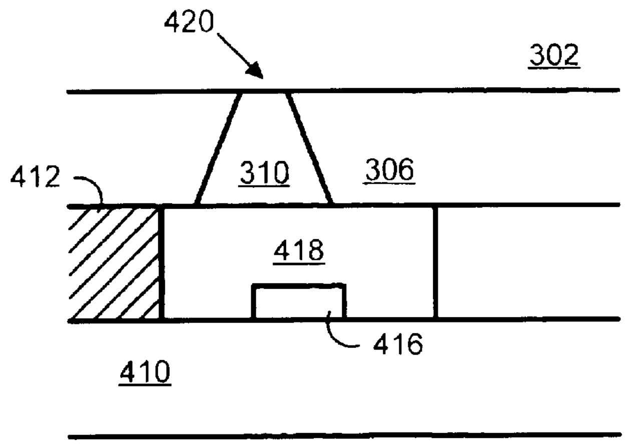
FIG. 4 is a schematic cross-sectional partial view taken through section line 4—4 of FIG. 3 showing the ink chamber arrangement of the print cartridge of FIG. 3.
Figure 5:
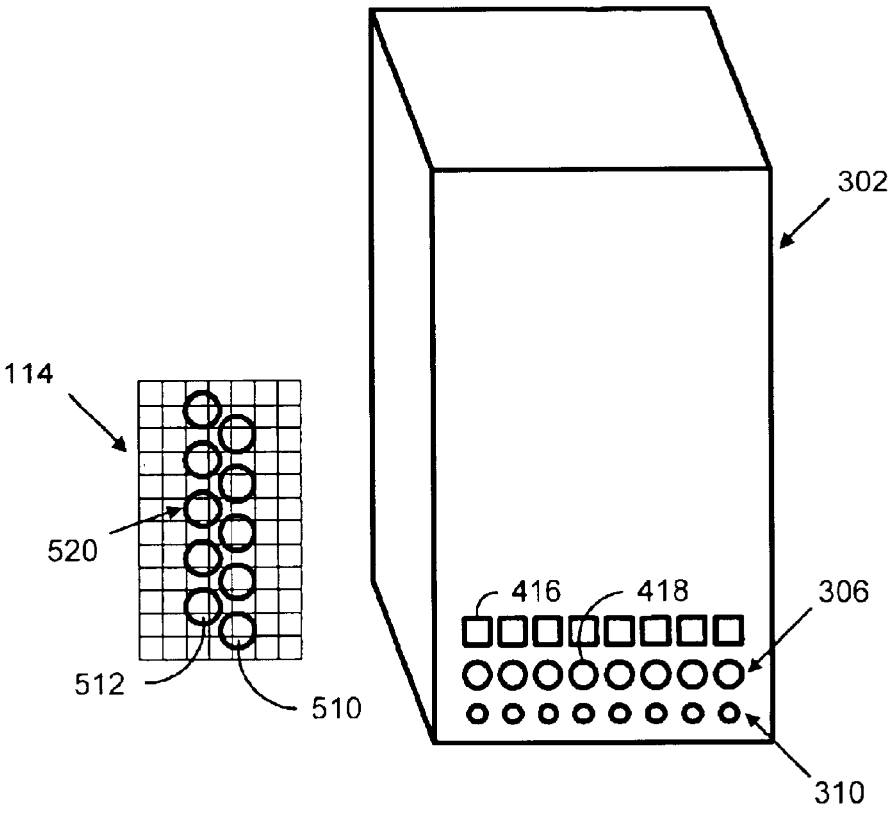
FIG. 5 shows for illustrative purposes only a perspective view of a thermal head assembly, printing ink droplets.

III. Component and Operation Details:

FIG. 4 is a cross-sectional schematic taken through section line 4—4 of FIG. 3 of the inkjet print cartridge 236 utilizing the present invention. A detailed description of the present invention follows with reference to a typical printhead used with print cartridge 236. However, the present invention can be incorporated in any printhead configuration. Also, the elements of FIG. 4 are not to scale and are exaggerated for simplification.

Referring to FIGS. 1–3 along with FIG. 4, as discussed above, conductors (not shown) are formed on the back of thermal head assembly 302 and terminate in contact pads for contacting electrodes on carriage 234. The other ends of the conductors are bonded to the printhead 110 via terminals or electrodes (not shown) of a substrate 410. The substrate 410 has ink ejection elements 416 formed thereon and electrically coupled to the conductors. The integrated circuit chip provides the ink ejection elements 416 with operational electrical signals. A barrier layer 412 is located between the nozzle member 306 and the substrate 410 for insulating conductive elements from the substrate 410.

An ink ejection or vaporization chamber 418 is adjacent to each ink ejection element 416, as shown in FIG. 4, so that each ink ejection element 416 is located generally behind a single orifice or nozzle 310 of the nozzle member 306. The nozzles 310 are shown in FIG. 4 to be located near an edge of the substrate 410 for illustrative purposes only. The nozzles 310 can be located in other areas of the nozzle member 306, such as centered between an edge of the substrate 410 and an interior side of the body 116. Each ink ejection element 416 acts as ohmic heater when selectively energized by one or more pulses applied sequentially or simultaneously to one or more of the contact pads via the integrated circuit. The ink ejection elements 416 may be heater resistors or piezoelectric elements. The orifices 420 may be of any size, number, and pattern, and the various figures are designed to simply and clearly show features of the invention. The relative dimensions of the various features have been greatly adjusted for the sake of clarity.

Referring to FIGS. 1–4, during a printing operation, ink stored in an ink container 242 defined by the printhead body 116 generally flows around the edges of the substrate 410 and into the vaporization chambers 418. Energization signals are sent to the ink ejection elements 416 and are produced from the electrical connection between the print cartridges 236 and the printer 200. Upon energization of the ink ejection elements 416, a thin layer of adjacent ink is superheated to provide explosive vaporization and, consequently, cause a droplet of ink to be ejected through the orifice or nozzle 420. The vaporization chamber 418 is then refilled by capillary action. This process enables selective deposition of ink on print media 114 to thereby generate text and images.

Referring to FIGS. 1–4 and FIG. 5 during the printing process, ink ejection elements 416 in the thermal head assembly 302, cause ink to be superheated in the vaporization chambers 418. Ink droplets 520 are forced through the nozzles 310 in the thermal head assembly 302, onto the print media 114. All nozzles 310 do not eject simultaneously. The nozzles 310 are divided into rows so that there are odd rows 510 and even rows.

Figure 6:
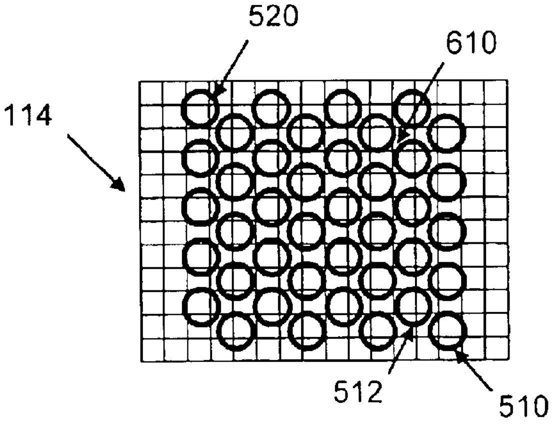
FIG. 6 shows for illustrative purposes only a pattern of odd/even ink droplets on a print media.

FIG. 6 is an illustration showing more ink droplets 520 having been printed on the print media 114. An odd row 510 is printed adjacent to an even row 512. In the print swath odd rows 510 are printed next to even rows 512 and between the ink droplets 520 are areas of white space 610. The present invention employs a system to decrease the white space 610 between ink droplets 520.

Figure 7:
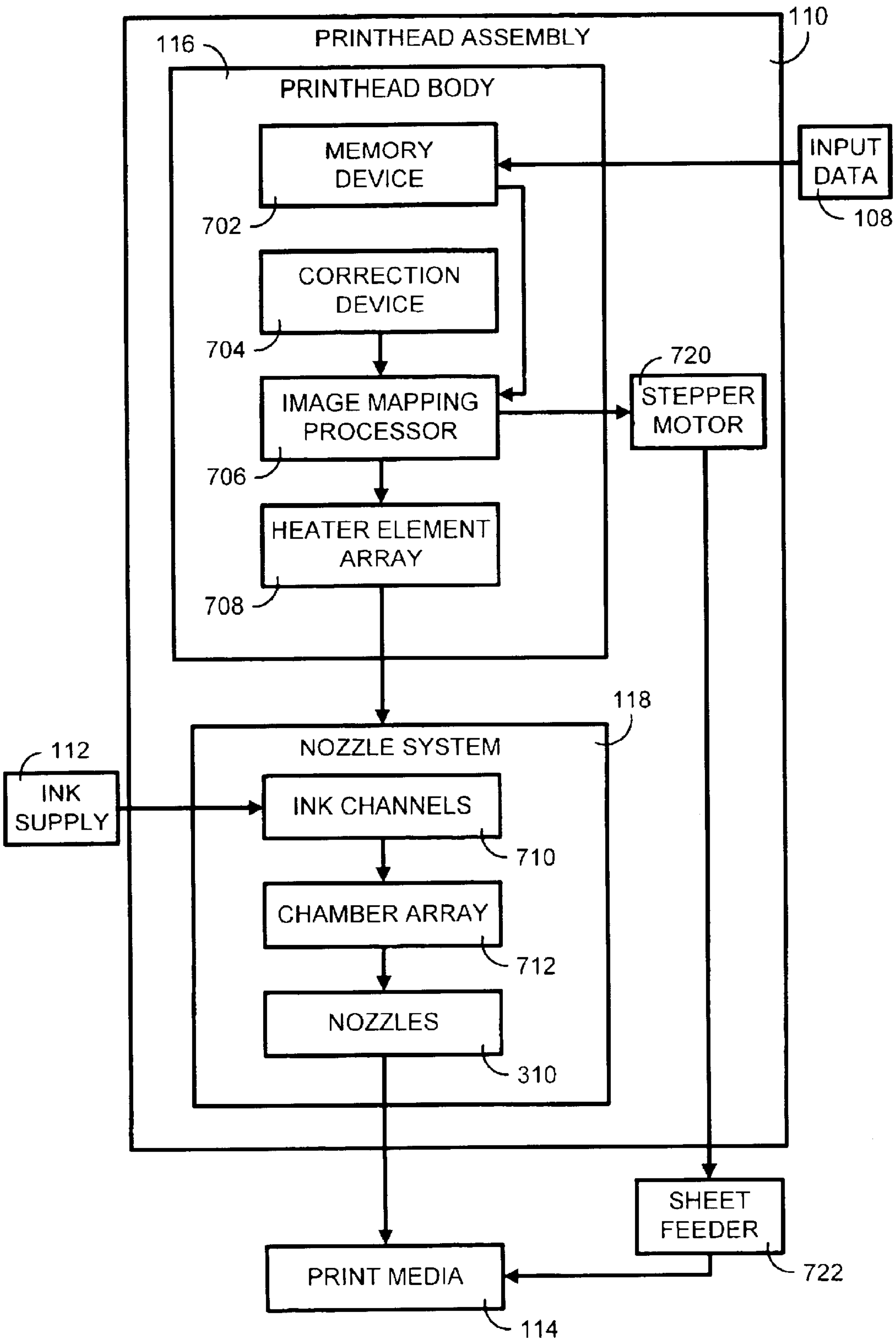
FIG. 7 is a high level flow diagram illustrating the printhead and printing system of the present invention.

FIG. 7 is a block diagram showing elements of the controller devices of the present invention that combine to decrease image defects by reorganizing the drop pattern and therefore decreasing aberrations such as nozzle outs and white space. In particular, the memory device 702 stores the data received from the input data 108. This data is forwarded to an image mapping processor 706 which would have the relative printmode, print mask and print-media height parameters imbedded in the controller.

The correction device 704 would provide the image mapping processor 706 with the adjustments [1–n] to be made to the paper advance motor 720 or to the number of passes, or positions of dots to be printed on the print media 114. The image mapping processor 706 is a controller for the heater element array 708. The heater element array 708 causes ink in the chamber array 712 to super heat and expel ink droplets through the nozzles 310 onto the print media 114. Ink to the chamber array 712 is replaced by capillary action via the ink channels 710.

The print media 114 is advanced by the sheet feeder 722 under the control of the paper advance motor 720. The advance is the print media height and could factor the number of nozzles 310 used in each pass of the printmode system referred to below in FIG. 8.

Figure 8:
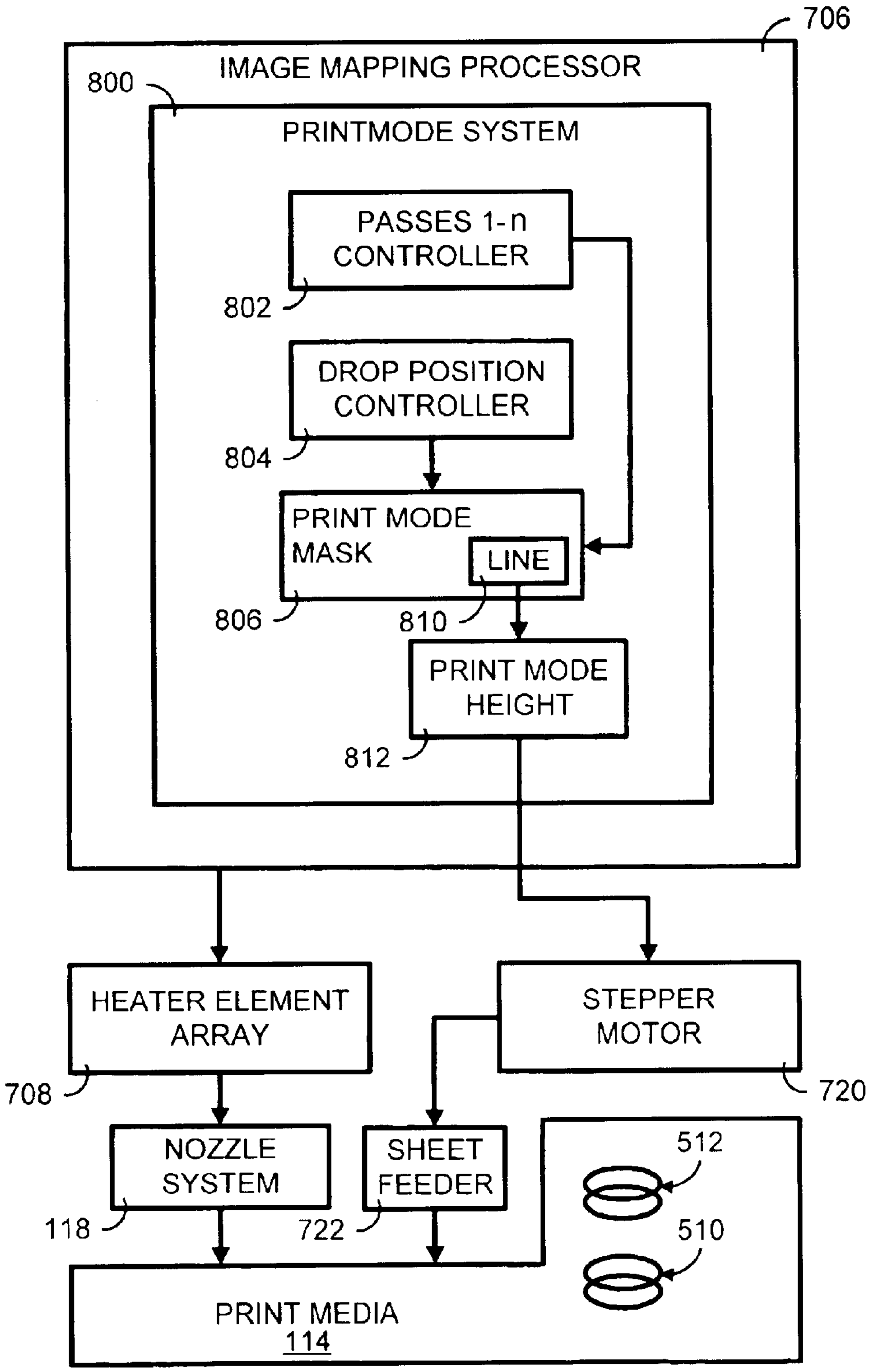
FIG. 8 is a flow diagram illustrating the image mapping processor of the present invention.

FIG. 8 is a block diagram showing some of the components of the printmode system 800 in the image mapping processor 706. The printmode system 800 is that part of the controller that regulates the number of passes, 1–n, through the passes 1–n controller 802. The image mapping processor 706, also calculates the position of each ink droplet through a drop position controller 804. The data from the passes 1–n controller 802 and the drop position controller 804 are used by the printmode mask 806 to calculate the position of each ink droplet 520 to be printed to the print media 114 through the electronic stimulation of the heater array element 708.

Simultaneously the line calculator 810 utilizes information from the printmode mask 806 and the passes 1–n controller 802, to determine the printmode height 812. This information is utilized to advance the print media 114 through the paper advance motor 720. As noise, either mechanical or electrical or other, can effect the accuracy of ink droplet 506 placement, an embodiment of the present invention is to artificially shift the media advance through the sheet feeder 722. In odd rows 510 the media advance is increased a ½ nozzle spacing distance, and in the next even row 512 the media advance is decreased a ½ nozzle spacing distance. The correction factor in the printmode mask 806 providing an under/over advance tends to hide errors from the mechanical parts.

Figure 9A:
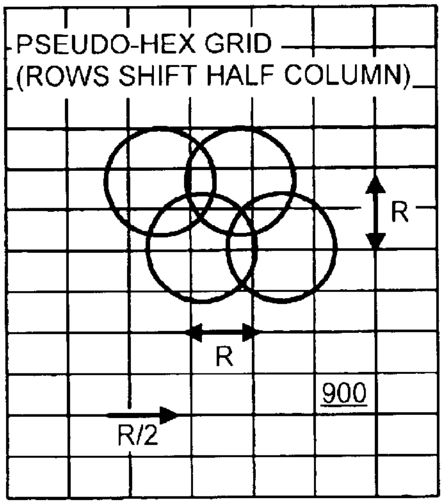
FIG. 9A shows a pseudo-hexagonal drop placement pattern for rows shifted a half column incorporated in the present invention.
Figure 9B:
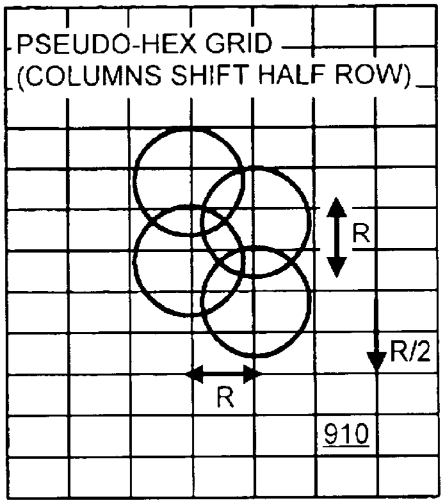
FIG. 9B shows a pseudo-hexagonal drop placement pattern for columns shifted a half row incorporated in the present invention.

FIG. 9A is a diagram illustrating a pattern of ink droplets 506 where the rows have been offset ½ column pseudo-hex grid rows shift half column 900, and FIG. 9B shows a similar pattern of ink droplets 506 where the columns have been vertically offset ½ a row pseudo-hex grid columns shift half row 910. The rasterization engine, not shown, treats each case as if it where not offset. This maintains maximum simplicity for the purposes of calculating the data and enables the utilization of standard engines and software. This process can introduce intentional noise, horizontal or vertical offsetting, through the correction device 704. This is achieved through the selection of one or the other pseudo-hex grid. This noise would then decrease image defects such as banding. These patterns, pseudo-hex grid rows shift half column 900 and pseudo-hex grid columns shift half row achieve the effects of over/under advance illustrated in FIG. 8, or by having sufficient native resolution to selectively place drops on a specified grid location in a single pass.

Figure 10A:
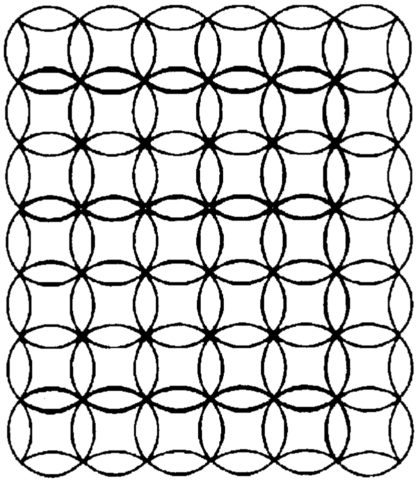
FIG. 10A illustrates the boundary condition for filling white space using a 1200 dpi with a dot diameter of 1.414×pitch, rectangular grid writing system.
Figure 10B:
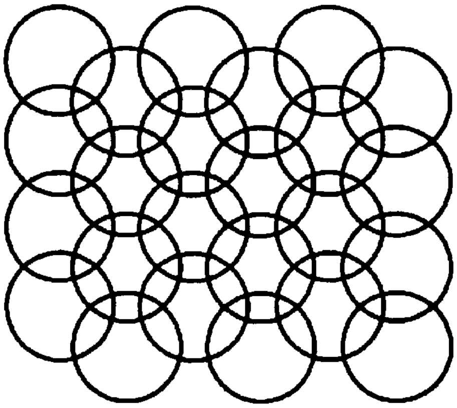
FIG. 10B illustrates the boundary condition for filling white space using a 2400 dpi with a dot diameter of 2.848×pitch, pseudo-hexagonal grid writing system.

These effects are further illustrated in FIG. 10. FIG. 10A shows the overlap resulting from printing drops on a standard grid. FIG. 10B is an image from drops on a pseudo-hex grid using the same oversize drops as FIG. 10A.

Therefore, in conclusion, the correction device 702 and the image mapping processor 706 are embodiments in the present invention that minimize defects on the print media 114 and/or conserve ink 112 or toner. This is achieved by employing a pseudo-hex format of ink drop placement 900, 910.

Basically, two factors are involved in the embodiment of the present invention, dot size and the eventual addressable grid location of each dot. Utilizing these factors in an embodiment of the present invention, three possibilities may arise. The device could be programmed to incorporate a multi-pass mode incorporating a higher grid resolution that can be addressed in a single pass, the nozzle density could be doubled, or the system could incorporate double the number of columns using a suitable technique.

As one example, if the data input [page rasterization resolution], was N×N, and the dots were sized approximately for N×N, firing a single drop on each N×N grid location would result in an addressable resolution of double being added to either columns or rows. That is, if the data was input at 600 dots per inch, dots would be approximated in size for 600 dots per inch. The system could then add an addressable resolution of 1200 columns per inch or 1200 rows per inch, and selectively shift subsets of drops to the specific subsets of the higher resolution grid location, such that the drop placement pattern was a pseudo-hexagonal pattern. The system therefore provides for various options in the production of the grid pattern.

In addition, the correction device 702 allows the rasterization engine to interpret the data as not offset allowing the system to operate on standard rasterization engines as well as employing standard software. The overall result is a process employing the efficiency benefits of calculating data on a standard square plus the dot overlap benefits of a hexagonal close pack grid.

The foregoing has described the principles, preferred embodiments and modes of operation of the present invention. However, the invention should not be construed as being limited to the particular embodiments discussed. As an example, the above-described inventions can be used in conjunction with inkjet printers that are not of the thermal type, piezo, digital printing process etc., as well as inkjet printers that are of the thermal type. Thus, the above-described embodiments should be regarded as illustrative rather than restrictive, and it should be appreciated that variations may be made in those embodiments by workers skilled in the art without departing from the scope of the present invention as defined by the following claims.

IV. Conclusion

The present invention minimizes defects on the print media but conserves the use of ink or toner. The system also operates on available rasterization engines so that it is commercially viable in that it utilizes available software. The system also allows for greater dot misplacement, or allows a balance in dot size for a combination of decreased ink/toner with a decrease in sensitivity to placement error. This results in a decrease in the white space between lines of print and a decrease in the hue shift banding due to small changes in pen to pen alignment. This will result in a decrease in banding and more consistent color hues in the printed image.

As the invention addresses both dot size and addressable grid location, the system can be manipulated on the basis of number of passes, nozzle density, and number of columns.

The description of the present invention has been presented for purposes of illustration and description, but is not intended to be exhaustive or limited to the invention in the form disclosed. Many modifications and variations will be apparent to those of ordinary skill in the art. Therefore, the foregoing description should not be taken as limiting the scope of the invention defined by the appended claims.

The foregoing has described the principles, preferred embodiments and modes of operation of the present invention. However, the invention should not be construed as being limited to the particular embodiments discussed. As an example, the above-described inventions can be used in conjunction with inkjet printers that are not of the thermal type, as well as inkjet printers that are of the thermal type. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A printhead for producing ink drops that efficiently overlap one another, comprising:

a programmable scheme configured to create addressable pixel locations of the ink drops and to selectively instruct the printhead to fire the ink drops a particular dot size so that they cover a geometrical overlay grid with a pseudo hexagonal grid pattern on a predetermined subset of the addressable pixel locations.

2. The printhead of claim 1, wherein the dot size covers N×N drops per square inch that are to be printed on a target print media.

3. The printhead of claim 1, further comprising a programmable firing scheme that instructs the printhead to fire ink drops with dot sizes that conform with an N×N grid for improving sensitivity to placement errors.

4. A method for producing ink drops with an inkjet printhead that efficiently overlap one another, comprising:

creating addressable pixel locations of the ink drops;

selectively firing the ink drops a particular dot size so that they cover an overlay grid on a predetermined subset of the addressable pixel locations to produce a pseudo hexagonal grid pattern; and creating ink dot misplacement configured to balance ink dot size to decrease ink and to decrease sensitively to placement errors.

5. The method of claim 4, further comprising shifting locations of the ink drops with a 2N×N ink drop placement control within N×N pixels.

6. The method of claim 4, further comprising firing the ink drops on a printed media to create an image that is rasterized at an N×N resolution.

7. The method of claim 4, further comprising using a 2N×N ink drop placement controller configured to shift placement locations of the ink drops within N×N pixels.

8. An inkjet printhead for reducing sensitivity to ink dot placement errors, comprising:

a nozzle member fluidically coupled to an ink supply; and a processor coupled to the nozzle member and being preprogrammed with a correction scheme configured to create addressable pixel locations of the ink drops and selectively instruct the nozzle member to fire the ink drops with a pseudo hexagonal grid pattern on a predetermined subset of the addressable pixel locations.

9. The printhead of claim 8, further comprising at least one of a preprogrammed single pass printing mode and a preprogrammed multiple pass printing mode.

10. The printhead of claim 8, wherein the pseudo hexagonal grid pattern includes ink dots that vary in size.

11. The printhead of claim 8, further comprising a preprogrammed ink drop ordering scheme configured to eliminate random clustering of ink drops by ordering the ink droplets in a pattern to decrease banding and create consistent color hues on the print media.

12. The printhead of claim 11, wherein the preprogrammed ink drop ordering scheme is further configured to perform at least one of doubling nozzle density with constant drop size and doubling columns per inch ink dots of close pack ink patterns of the pseudo hexagonal grid pattern.

13. The printhead of claim 12, further comprising a preprogrammed firing scheme configured to double columns per inch of the ink drops of the close pack ink patterns.

* * * * *